Sept. 24, 1929.     F. F. DORSEY     1,729,285
SHOCK ABSORBER
Filed June 22, 1928

Inventor
Farnum F. Dorsey

Patented Sept. 24, 1929

1,729,285

UNITED STATES PATENT OFFICE

FARNUM F. DORSEY, OF ROCHESTER, NEW YORK, ASSIGNOR TO NORTH EAST ELECTRIC COMPANY, OF ROCHESTER, NEW YORK, A CORPORATION OF NEW YORK

SHOCK ABSORBER

Application filed June 22, 1928. Serial No. 287,532.

This invention relates to shock absorbers of the type used upon motor vehicles to diminish the flexion and to retard the recoil of the springs in consequence of irregularities in the road surface.

It has been found that in devices of the kind in question the following characteristics are desirable: first, that little retarding effect be exerted for slight displacements of the springs from their normal position; second, that the resistance increase rapidly as the springs are increasingly flexed; third, that the resistance during recoil be substantially greater than that during flexion; and fourth, that this resistance to the recoil of the springs be greatest in the position of greatest flexure and fall off rapidly as the springs return to normal position.

The purpose of the present invention is to produce a simple, compact and inexpensive shock absorber capable of fulfilling the foregoing conditions and operating mechanically, that is, without the use of a fluid resisting medium.

To the foregoing end it is proposed to use a construction in which one or more friction shoes slide over a cylindrical friction surface, the shoes being so arranged as to be self-energizing in one direction only, and to control the pressure of engagement of each shoe with the friction surface by a spring so arranged as to have an effect which increases rapidly as the shoe is displaced from normal position.

Figure 1:
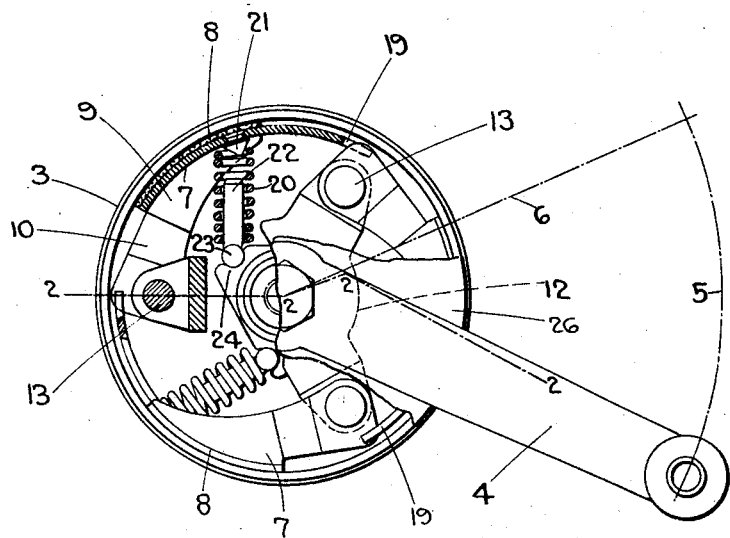
Figure 2:
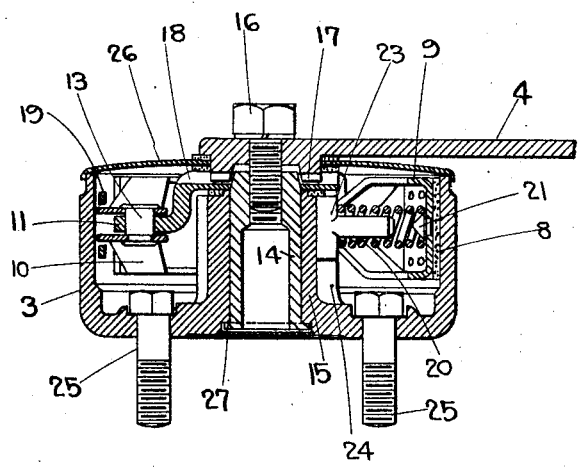

In the accompanying drawings, Fig. 1 is a front elevation of a shock absorber embodying the present invention, with parts shown broken away and in section, and Fig. 2 is a substatially horizontal section, on the broken line 2—2, looking upwardly.

The invention is illustrated as embodied in a shock absorber of a general form which is familiar, comprising a body or shell 3, adapted to be secured to the chassis frame of a vehicle, and a swinging arm 4 which is connected with one of the axles. The means for connecting the arm with the axle are not shown, as they may be of any ordinary or suitable form, and as devices of this general construction and mode of operation are well known, but it will be understood that the arm is shown in its normal position in the drawings, and that flexion of the vehicle springs, resulting from the diminution of the distance between the axle and the chassis frame, results in a swinging movement of the arm along the arc 5 in Fig. 1, the extreme upper position of the arm being indicated by the dot-and-dash line 6.

Each of the friction shoes, of which three are shown, comprises a sheet-metal body 7, faced with leather or other suitable frictional material 8, and curved to conform to the inner surface of the shell 3, this inner cylindrical surface constituting the stationary friction surface of the device. Each friction shoe is formed with two integral side flanges 9, which terminate in arms 10. These arms are bent toward each other and lie on opposite sides of one of the three arms 11 of a spider 12, by means of which the friction shoes are actuated, each pair of arms 10 being connected with the spider by a pivot 13.

The spider 12 and the arm 4 are pivotally supported by a stem 14, which turns in a bearing sleeve 15 at the middle of the shell. The spider and the arm are connected with the stem by a screw 16, and they are locked together by means of projections 17, at the hub of the arm, which engage grooves 18 in the spider, so that the swinging movements of the arm are transmitted positively to the spider and through it to the friction shoes. To prevent lateral displacement of the free ends of the friction shoes, each shoe is extended to a position in line with the pivot of the next shoe, and is provided with a recessed extremity 19, which loosely embraces the arms 10 of the next shoe.

The outward pressure of each shoe against the friction surface of the shell is controlled by a coiled compression spring 20, which is seated, at its outer end, against a conical stud 21 on the shoe. A T-shaped spring guide has a shank 22 loosely seated within the spring and a cylindrical cross head 23, which engages a concave seat or groove 24 formed at the side of the bearing sleeve 15. The head 23 can rock pivotally in its seat, and the outer end of the spring can also rock to the necessary extent upon the stud 21. The spring is so proportioned that in the normal position of the parts, as shown in Fig. 1, it is under slight compression, and its pressure is directed at an acute angle to the friction surfaces. Owing to the eccentric position of the seat or groove 24, however, it will be apparent that as the arm 4 swings upwardly, thus imparting counter-clockwise movement to the friction shoe, the distance between the stud 21 and the bearing 24 will be diminished, thus shortening the spring 20 and increasing its pressure against the shoe. At the same time, the line of action of the spring approaches a radial position in which the spring pressure will be normal to the friction surfaces. In consequence of these two actions, the effectiveness of the spring increases rapidly as the parts are moved away from normal position, thus causing the frictional drag of the shoe to increase rapidly.

The position of the pivot 13, with relation to the friction shoe, is such that during movement of the parts away from normal position, the shoe is not self-energized, so that its drag depends only upon the action of the spring and is, therefore, relatively slight. When the movement of the parts is reversed, however, owing to the recoil of the vehicle springs, the shoe becomes, to a large extent, self-energized, that is to say, the drag of the shoe against the stationary friction surface is in a direction tending to cause an outward swinging movement of the shoe about the pivot 13, so that the pressure between the shoe and the stationary surface is greatly enhanced. Consequently, the frictional resistance during recoil is much greater than during compression of the vehicle springs. At the same time, however, this return movement causes the spring 20 to return toward its normal position, and thus diminishes the effectiveness of this spring, so that the drag of the friction shoe falls off rapidly as the parts approach normal position. The shock absorber thus accomplishes all of the results hereinbefore set forth as desirable in a device of this character.

The stem 14 is provided with a flange 27 at its inner end to hold it in its bearing, and is counterbored to provide a receptacle for a supply of lubricant. The outer side of the body 3 is closed by a cover 26 which is held in place by the hub of the arm 4. The body may be secured to the vehicle frame by two bolts 25, in the usual manner.

The invention claimed is:

1. In a shock absorber, the combination of a stationary friction surface, a friction shoe movable over said surface, an oscillatory member to which the friction shoe is swingingly attached so as to be self energizing in one direction only of its movement, a stationary spring support, and a compression spring interposed between and having a pivotal relation with said support and the friction shoe, the spring support being so located that both the compression of the spring and its angle with the friction surface are increased as the oscillatory member moves in the direction in which the friction shoe is not self energizing.

2. In a shock absorber, the combination of a stationary drum provided with an inner friction surface and a central bearing, a stem mounted to turn in said bearing, a spider attached to the outer end of said stem, a plurality of friction shoes pivoted to said spider and bearing against said friction surface, pivotal spring bearings located eccentrically with respect to said stem and bearing, and springs pivotally engaging the respective shoes and spring bearings and arranged to press the shoes outwardly with a force increasing as the shoes are moved in one direction away from normal position.

FARNUM F. DORSEY.